Nov. 20, 1928.
W. J. TANNER
1,692,594
ROTATABLE ADVERTISING DEVICE
Filed July 13, 1925     3 Sheets-Sheet 1
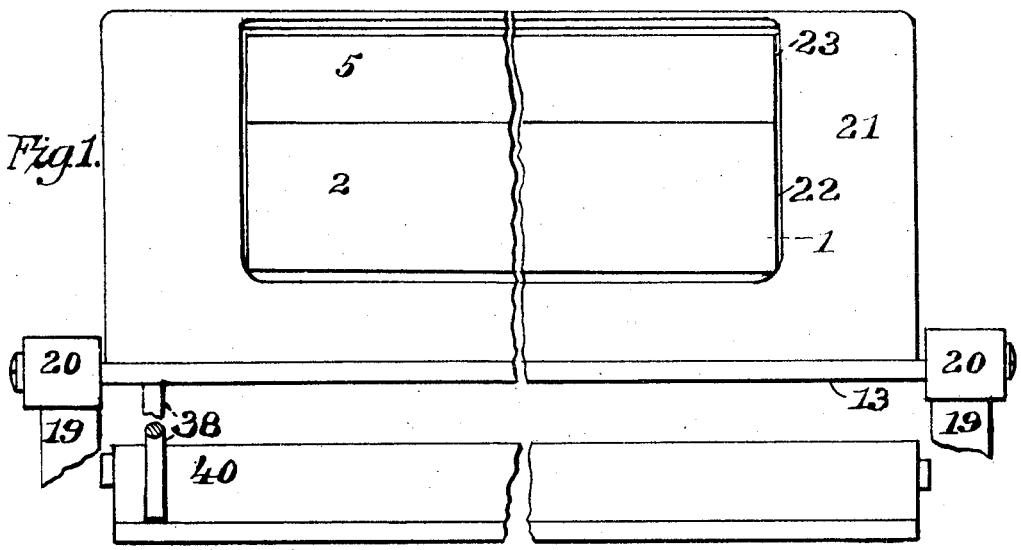
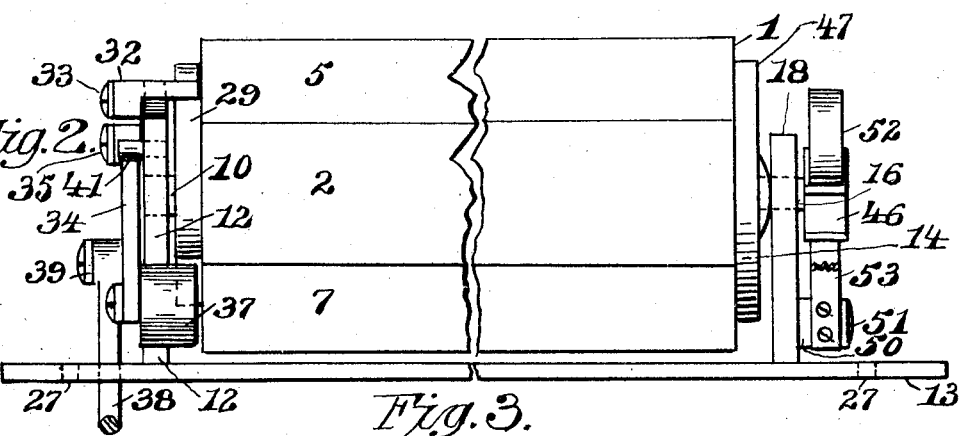
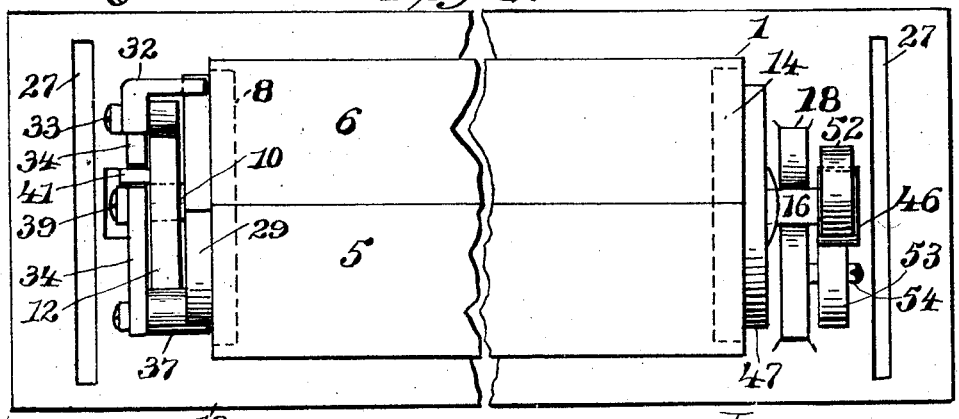
INVENTOR
William J. Tanner.
By Geo. D. Phillips, Attorney Nov. 20, 1928.　　　　　　　　　　　　　　　　1,692,594
W. J. TANNER
ROTATABLE ADVERTISING DEVICE
Filed July 13, 1925　　　3 Sheets-Sheet 2
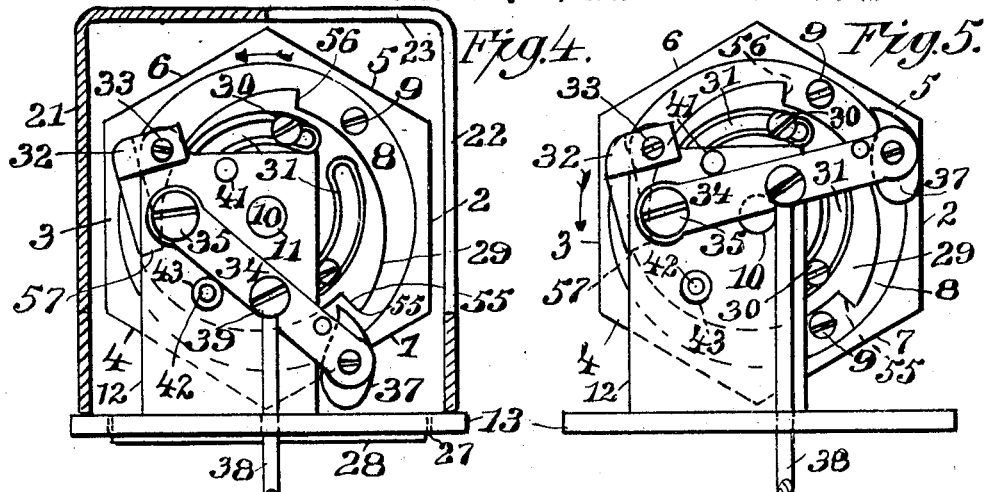
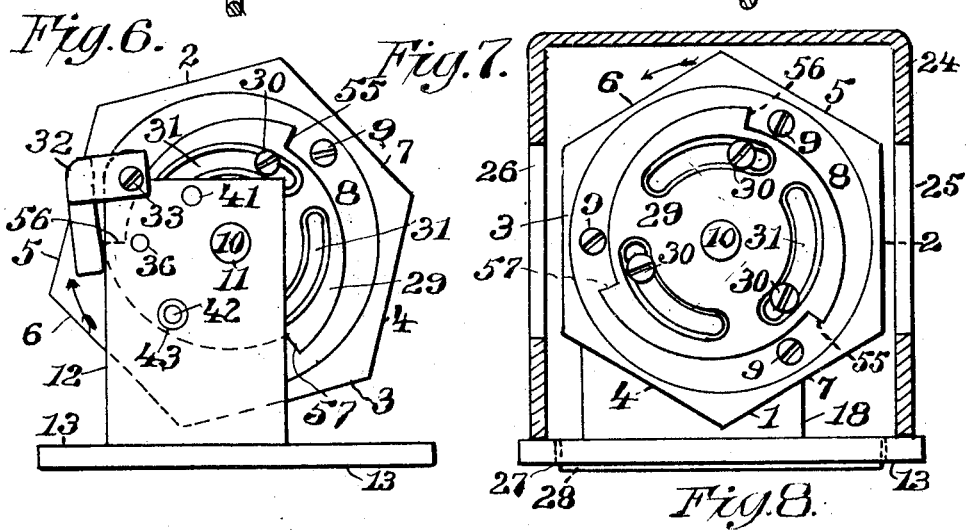
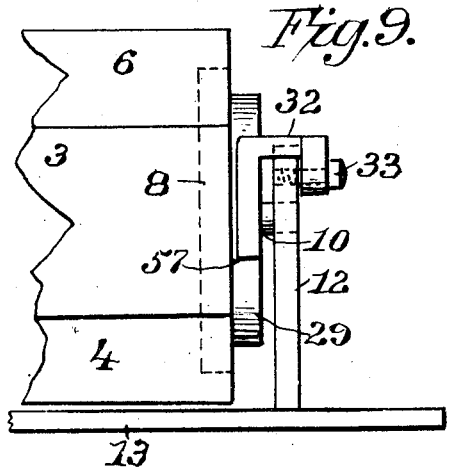
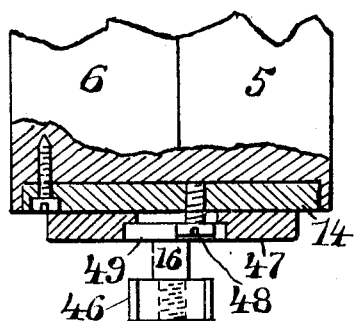
INVENTOR.
William J. Tanner
By Geo. D. Phillips, Attorney.

Nov. 20, 1928.
W. J. TANNER
1,692,594
ROTATABLE ADVERTISING DEVICE
Filed July 13, 1925
3 Sheets-Sheet 3
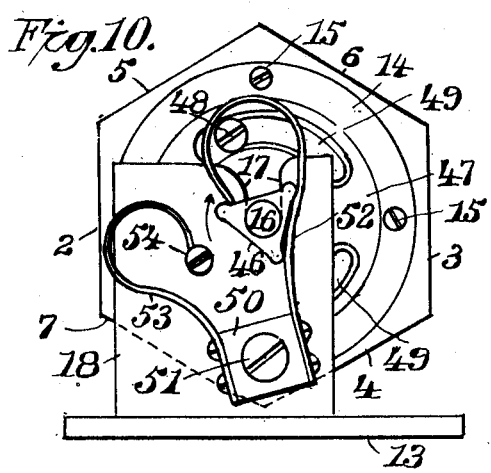
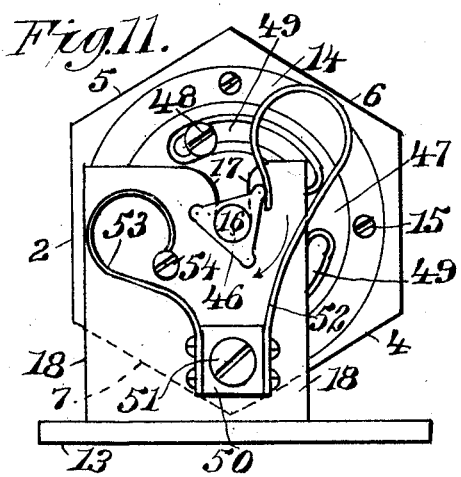
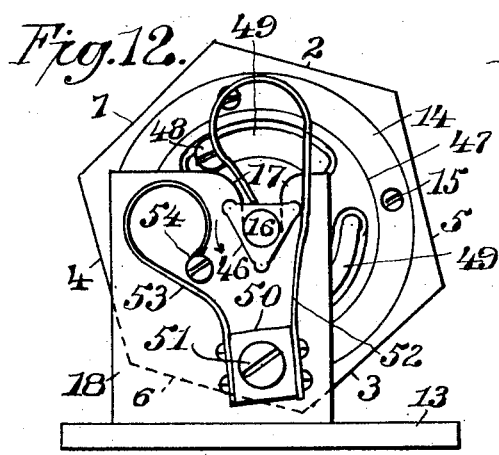
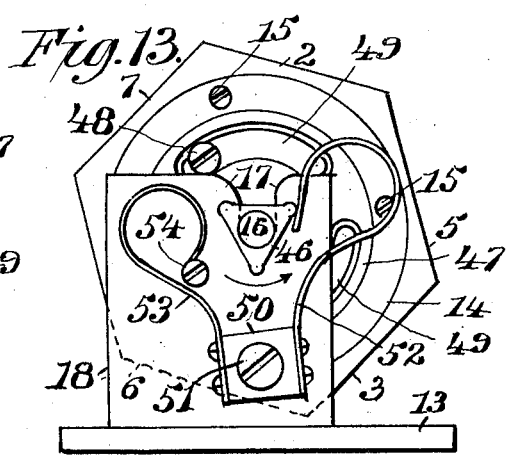
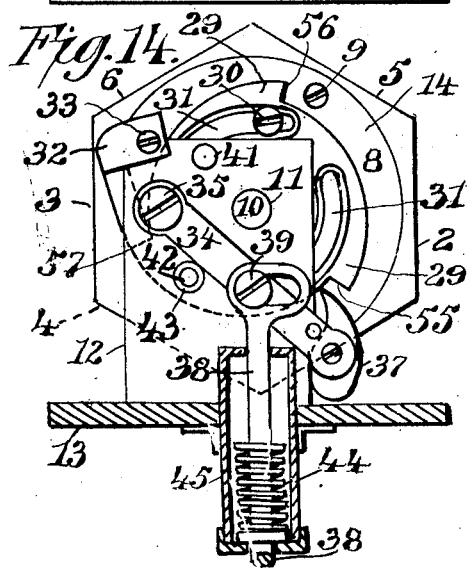
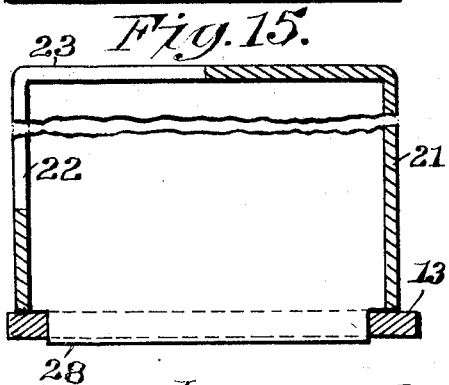
INVENTOR
William J. Tanner.
By Geo. L. Phillips, Attorney Patented Nov. 20, 1928.

1,692,594

UNITED STATES PATENT OFFICE.

WILLIAM J. TANNER, OF BRIDGEPORT, CONNECTICUT.

ROTATABLE ADVERTISING DEVICE.

Application filed July 13, 1925. Serial No. 43,128.

This invention relates to rotatable advertising reels adapted to have a step by step rotation to bring in view the characters displayed thereon, and is adapted, as an advertising medium, to be attached to cash registers or any suitable machine or place adapted for rotating the reel.

The invention has for its object to provide suitable mechanism for controlling the rotation of the device and automatically bringing it to an absolute stop with the advertising matter thereon always in view.

Referring to the accompanying drawings wherein the same reference characters indicate corresponding parts—

Figure 1 represents a broken front elevation of the display reel and its housing, and broken view of a part of a cash register to which it is removably attached.

Figure 2 is a broken front elevation of the display reel and its actuating mechanism, and broken view of its base.

Figure 3 is a broken plan view of the display reel and its base.

Figure 4 is an end elevation of the display reel and its base, broken view of the reel's actuating rod, and transverse sectional view of the reel housing.

Figure 5 is a similar end elevation of the display reel and its base, with the housing removed, and broken view of the reel actuating rod.

Figure 6 is an end elevation of the display reel and one of its supporting standards with the reel actuating mechanism removed.

Figure 7 is an end elevation of the display reel with its actuating mechanism removed, also transverse sectional view of a housing having front and back openings.

Figure 8 is a broken plan partly in section of the reel and sectional view of a part of its adjusting mechanism.

Figure 9 is a broken side elevation of the reel and base with its actuating mechanism removed.

Figures 10, 11, 12, and 13, represent end elevations of the reel showing the action of the reel adjusting mechanism.

Figure 14 is an end elevation of the reel with its actuating mechanism in its normal position, sectional view of the reel base, buffer spring casing, and broken view of the reel actuating rod, and Figure 15 is a broken transverse sectional view of the reel housing and base.

The display reel 1 is of hexagon shape having the display faces 2, 3, 4, 5, 6, and 7. The plate 8 is attached to one end of the reel by screws 9 and has the journal 10 projecting outwardly therefrom into the bearing 11 of the standard 12 rising from the base 13. 14 is a similar plate secured to the opposite end of the reel by screws 15. The journal 16 of this plate rests at the bottom of the open bearing 17, Figures 3, 10, 11, 12, and 13, formed in the standard 18. This open bearing permits the ready insertion or temporary removal of the reel.

In Figure 1 is shown ready means by which the device is removably attached to cash registers. 19 represents broken uprights of a cash register, and 20 represents overlying caps under which the ends of the base 13 are inserted.

Two forms of housings for the reel are shown, viz: 21, Figures 1, 4, and 15, have the opening 22 on one of its sides, and a part of its top cut away to form the opening 23. The housing 24, Figure 7, have the two opposed side openings 25, 26, the purpose of which will be hereinafter more fully explained. 27, Figure 3, are slots in the base 13 to receive the end extensions 28, Figures 4 and 7, for removably locating the housing to the base.

The ratchet plate 29 is freely mounted on the journal 10 and is adjustably secured to the plate 8 by the screws 30 located in the curved slots 31. 32 is the dog for the ratchet plate mounted on the screw 33 affixed to the standard 12 for checking the reverse movement of the reel.

The reel actuating lever 34 is mounted on screw 35 secured in the threaded hole 36, Figure 6, of the standard 12. The pawl 37, carried by the lever, is adapted to engage the teeth of the ratchet plate 29 to rotate the reel. 38 is a rod journaled on the screw 39 of the lever 34 and is adapted to be engaged by the ordinary key coupler 40, Figure 1, of a cash register, and, as this key coupler is directly connected with the keys, not shown, of the cash register, it is evident that a depressed key will elevate the key coupler and cause the reel to rotate through the medium of the rod 38, lever 34, and its pawl 37. Stops 41, 42, are located in the standard 12 to limit the travel of the lever 34, the latter being equipped with the rubber bumper 43. To insure the return of the lever 34, the recoil spring 44, Figure 14, is mounted on the rod 38 enclosed within the casing 45 attached to the base 13.

On the other end of the reel is located the reel adjusting mechanism, Figures 10, 11, 12, and 13, comprising the equilateral triangular or reel locating member 46, mounted on the journal 16. The plate 47 freely embraces the journal 16 and is adjustably secured to the plate 14 by the screws 48 located in the curved slots 49. 50 is a block mounted to oscillate on the screw 51 secured to the standard 18. Springs 52, 53, are secured to this block, the former engages the triangle 46 above its axis, and the latter is in contact with the kicking post 54.

The several faces of the reel may be given a "black board" finish or a finish of any color so that various advertising matter may readily be inscribed thereon and easily removed, or any other suitable means may be employed as a medium for utilizing the faces of the reel.

The principal object of the housing is to permit only certain predetermined faces of the reel to be seen through the openings therein each time a key is depressed. The ratchet plate 29 having three teeth 55, 56, and 57, it is evident that a normally stricken key will bring every third face of the reel into view. With the cash register so located that the advertising matter can be seen both back and front, then the housing 24, Figure 7, is employed.

As shown, the face 2 of the reel is seen at the front through the opening 25 of the housing, and the face 3 is seen at the back through the opening 26. The next rotative impulse of the reel will bring the faces 4 and 5 respectively in view, and the next impulse will bring to view the faces 6 and 7. The regularity of movement will result in bringing the several display faces of the reel into a vertical position where they can be seen at the openings in the housing. As the impulse given a key varies with the different operators, a heavy impulse will cause the reel to spin and may leave the reel in a position similar to that shown in Figure 6, where the dog 32 falls short of its engagement with the tooth 56 of the ratchet plate. This will place the triangle 46, Figure 11, against the stored up tension of the spring 52, when said spring will react and reverse the reel and bring the tooth 57, Figure 6, against the dog 32 and bring the reel to a standstill with the display faces in a vertical position opposite the openings in the housings 25, 26. The spring 52 and the triangular member 46 will then assume the position shown in Figure 10 with the upper face of the member 46 on an incline, which incline will indicate that the dog 32 is engaged with some one of the teeth of the ratchet plate. As the reel is rotating the corners of the triangular member 46 will engage the free end of the spring 52 and store up sufficient tension in the spring 53 to snap such free end onto the surface of the member 46, as shown in Figure 12.

The curved slots in the plates 29 and 47 enable the reel to be adjusted so as to bring any portion of its face to view that may be desired. A cylindrical reel or one having any number of faces may be employed and the teeth of the ratchet plate changed to correspond therewith.

The housing 21, Figures 4 and 15, shows but one face of the reel, and is employed when the cash register is so situated that only one side of the reel can be seen. The removable feature of the housings and reel form ready means for changing the character of the advertising matter of the reel.

An important feature of this advertising device is that it can be attached to any cash register without marring or in any manner defacing it. As the upper surface of the register is removed to make a place for the device, the upper surface of the reel housing will take its place, as a receptacle for articles, if so desired.

The device can be readily adapted to any construction of cash register by simply connecting the ratchet plate actuating lever to a movable element of the register.

The essential feature of the device resides in the rotative freedom of action of the reel under the varying impulses of the operator, and its invariable tendency to stop with some one of its advertising faces presented to view.

While I have shown the device applied to a cash register and adapted to be actuated by the same key member (a key coupler) that displays, or brings to view, the figures indicating the purchase price of an article, it is equally applicable to the figure display mechanism of any type of cash registers, by simply connecting the device therewith. Its field of operation is not, however, limited to cash registers, but it can be applied to any form or type of mechanism adapted to operate it.

While the member 52 is described as a spring its principal function is to actuate the reel locating member 46 and through said member locate the reel so that the characters on one or more of its faces will be brought into a readable position at each and every rotatable impulse imparted to the reel. Therefore, the member 52 need not be made elastic, as it can be entirely controlled by the spring 53, or any other elastic member suitably constructed and arranged to hold the member 52 in operative position with respect to the member 46.

With the hexagon reel as shown, the member 46, as before mentioned, will locate every third face of the reel into a position where the characters on these faces can readily be seen.

The reel can, however, be changed to any desired form, in which case, the shape of the member 46 will also be correspondingly changed to bring the readable faces of the reel into view.

Having thus described my invention what I claim is:—

1. An advertising device comprising a supporting base, standards thereon, a display reel having end journals detachably mounted in the standards, a ratchet plate adjustably secured to one end of the reel, a pivotally supported dog adapted to engage the teeth of the ratchet plate and check a reverse movement of the reel, and a pivotally supported pawl carrying lever for effecting a step by step rotation of the reel.

2. An advertising device comprising a display reel having an adjustable ratchet plate secured to one end, and an adjustable plate secured to the opposite end of the reel adapted for adjustment in unison with the ratchet plate.

3. An advertising device comprising a display reel, means for effecting a step by step rotation of the reel including a pawl carrying lever engaging a ratchet plate, a dog to engage the plate and check a reverse movement of the reel located at one end of the reel, of mechanism located at the opposite end of the reel for automatically effecting a partial reverse rotation of the reel when the dog is disengaged and reengage the dog.

4. An advertising device comprising a display reel, means for effecting a step by step rotation of the reel and a member for checking its reverse movement located at one end of the reel, means located at the opposite end of the reel including an angular member so located as to rotate in unison with the reel, an elastic member engaging the angular member to effect a partial reverse rotation of the reel when the reverse checking member is disengaged and reengage the same and thus bring the reel to a full stop.

5. A construction as in claim 4, in which the elastic member is anchored by one end to an oscillating member.

6. An advertising device comprising a display reel, mechanism for rotating the reel, means for temporarily checking a reverse rotation located at one end of the reel, a housing enclosing the reel having openings therein through which the reel may be seen, mechanism located at the opposite end of the reel for effecting a partial reverse movement of the reel and reengage the reverse checking mechanism and to bring to view advertising characters on the reel.

7. An advertising device comprising a display reel, a reel locating member carried by the reel, an oscillating member, a member carried by said oscillating member and engaging said reel locating member to temporarily halt the reel to bring into view the characters thereon, and an elastic member carried by the oscillating member to actuate the latter and through it the member engaging with the reel locating member.

In testimony whereof I affix my signature.

WILLIAM J. TANNER.